United States Patent
Chu et al.

(10) Patent No.: US 9,931,611 B2
(45) Date of Patent: Apr. 3, 2018

(54) MODIFIED HYDROPHOBIC SPONGES

(71) Applicant: The Research Foundation for the State University of New York, Albany, NY (US)

(72) Inventors: Benjamin Chu, Setauket, NY (US); Benjamin Hsiao, Setauket, NY (US); Zhe Wang, Stony Brook, NY (US)

(73) Assignee: The Research Foundation for the State University of New York, Albany, NY (US)

( * ) Notice: Subject to any disclaimer, the term of this patent is extended or adjusted under 35 U.S.C. 154(b) by 0 days.

(21) Appl. No.: 15/034,227

(22) PCT Filed: Nov. 4, 2014

(86) PCT No.: PCT/US2014/063788
§ 371 (c)(1),
(2) Date: May 4, 2016

(87) PCT Pub. No.: WO2015/066665
PCT Pub. Date: May 7, 2015

(65) Prior Publication Data
US 2016/0263552 A1  Sep. 15, 2016

Related U.S. Application Data

(60) Provisional application No. 61/899,349, filed on Nov. 4, 2013.

(51) Int. Cl.
*B01J 20/10* (2006.01)
*B01J 20/26* (2006.01)
(Continued)

(52) U.S. Cl.
CPC ............. *B01J 20/262* (2013.01); *B01J 20/10* (2013.01); *B01J 20/28011* (2013.01);
(Continued)

(58) Field of Classification Search
CPC ................................ B01J 20/10; B01J 20/262
(Continued)

(56) References Cited

U.S. PATENT DOCUMENTS 3,255,041 A   6/1966  Culp et al.
4,237,237 A   12/1980 Jarre et al.
(Continued)

FOREIGN PATENT DOCUMENTS

WO   2012/112553 A1   8/2012

OTHER PUBLICATIONS

Zhu et al. "Robust superhydrophobic polyurethane sponge as a highly reusable oil-absorption material" Journal of Materials Chemistry A, Mar. 8, 2013, 1, 5386-5393.
(Continued)

*Primary Examiner* — Edward Johnson
(74) *Attorney, Agent, or Firm* — Carter, DeLuca, Farrell & Schmidt, LLP

(57) ABSTRACT

Articles are provided for absorbing fluids. In embodiments, the articles of the present disclosure are modified to make them hydrophobic, thereby decreasing their affinity for water and similar liquids, while increasing their affinity for other hydrophobic materials, including oil. After use, the articles, in embodiments polyurethane sponges, may have their absorbed materials removed therefrom, and the articles may then be reused to absorb additional materials.

9 Claims, 2 Drawing Sheets

(51) Int. Cl.
*C08J 9/36* (2006.01)
*C02F 1/28* (2006.01)
*B01J 20/32* (2006.01)
*B01J 20/28* (2006.01)
*C09K 3/32* (2006.01)
*C02F 1/68* (2006.01)
*C02F 101/32* (2006.01)

(52) U.S. Cl.
CPC ... *B01J 20/28045* (2013.01); *B01J 20/28085* (2013.01); *B01J 20/3212* (2013.01); *B01J 20/3225* (2013.01); *B01J 20/3272* (2013.01); *C02F 1/285* (2013.01); *C08J 9/365* (2013.01); *C09K 3/32* (2013.01); *C02F 1/681* (2013.01); *C02F 2101/32* (2013.01); *C08J 2375/04* (2013.01)

(58) Field of Classification Search
USPC .......................................................... 502/402
See application file for complete search history.

(56) References Cited

U.S. PATENT DOCUMENTS

| | | |
|---|---|---|
| 5,484,867 A | 1/1996 | Lichtenhan et al. |
| 5,939,576 A | 8/1999 | Lichtenhan et al. |
| 6,881,445 B1 | 4/2005 | Arora |
| 7,915,159 B2 | 3/2011 | Bhanap et al. |
| 2006/0188732 A1 | 8/2006 | Lichtenhan et al. |
| 2008/0203031 A1 | 8/2008 | Thomson |
| 2009/0182094 A1 | 7/2009 | Weller |
| 2011/0054052 A1 | 3/2011 | Hwang et al. |
| 2011/0293374 A1 | 12/2011 | Mohmeyer et al. |

OTHER PUBLICATIONS

Zhang, L., et al., "Smart surfaces with switchable superoleophilicity and superoleophobicity in aqueous media: toward controllable oil/water separation", NPG Asia Materials, vol. 4, pp. 1-14 (2012).
Choi, S., et al., "A polydimethylsiloxane (PDMS) sponge for the selective absorption of oil from water", ACS Applied Materials & Interfaces, vol. 3, pp. 4552-4556 (2011).
International Search Report and Written Opinion from Application No. PCT/US2014/016347 dated May 14, 2014.
Wu, D., et al., "Design and Preparation of Porous Polymers", Chemical Reviews, 112 (7), pp. 3959-4015 (2012).
International Search Report and Written Opinion from Application No. PCT/US2014/063788 dated Mar. 20, 2015.

MODIFIED HYDROPHOBIC SPONGES

CROSS REFERENCE TO RELATED APPLICATIONS

This application is a National Stage of, and claims priority to, and the benefit of, International Patent Application No. PCT/US2014/063788 filed on Nov. 4, 2014, which, in turn, claims priority to, and the benefit of, U.S. Provisional Patent Application Ser. No. 61/899,349, filed on Nov. 4, 2013, the entire disclosures of each of which are incorporated by reference herein.

BACKGROUND

The present disclosure provides articles for absorbing fluids. In embodiments, the present disclosure provides articles that have been modified to make them hydrophobic, thereby decreasing their affinity for water and similar liquids, while increasing their affinity for other hydrophobic materials, including oil.

Oil spills can adversely affect the environment and are an increasing problem. Oil spills negatively impact waterways, lakes, rivers and oceans, and can be devastating to the environment and animal populations within and/or adjacent the affected waterways. Massive oil spills can result in long-term disastrous effects.

Oil recovery systems are utilized in the clean up of oil spills. One such oil recovery system includes the use of a sponge to soak up the contaminated oil. Once the contaminated oil is absorbed by the sponge, the absorbed oil in the sponge cavity can then be squeezed out of the sponge, leaving the oil-coated sponge behind. The oil-coated sponge can be reused and subsequently may then be disposed, if so desired.

Improved articles capable of removing oil and other hydrophobic materials from hydrophilic fluids, such as water, remain desirable.

SUMMARY

The present disclosure provides articles that have been modified to enhance their affinity for hydrophobic substances, including oil.

In embodiments, articles of the present disclosure include a porous polyurethane substrate; and a silicon material on at least a portion of the porous polyurethane substrate, wherein the porous substrate exhibits an increase in weight from about 3 times to about 35 times the initial weight of the porous substrate upon exposure to a hydrophobic material. The porous substrate, in embodiments, may be polymeric sponges.

Methods for making these articles are also provided. In embodiments, methods of the present disclosure include contacting a porous polyurethane substrate with a silicon material in solution for a period of time from about 1 hour to about 24 hours; drying the porous substrate at a temperature from about 80° C. to about 140° C. for a period of time from about 1 hour to about 12 hours, and recovering the porous polymeric substrate.

BRIEF DESCRIPTION OF THE FIGURES

Various embodiments of the present disclosure will be described herein with reference to the following figures, wherein.

DETAILED DESCRIPTION

Figure 1:
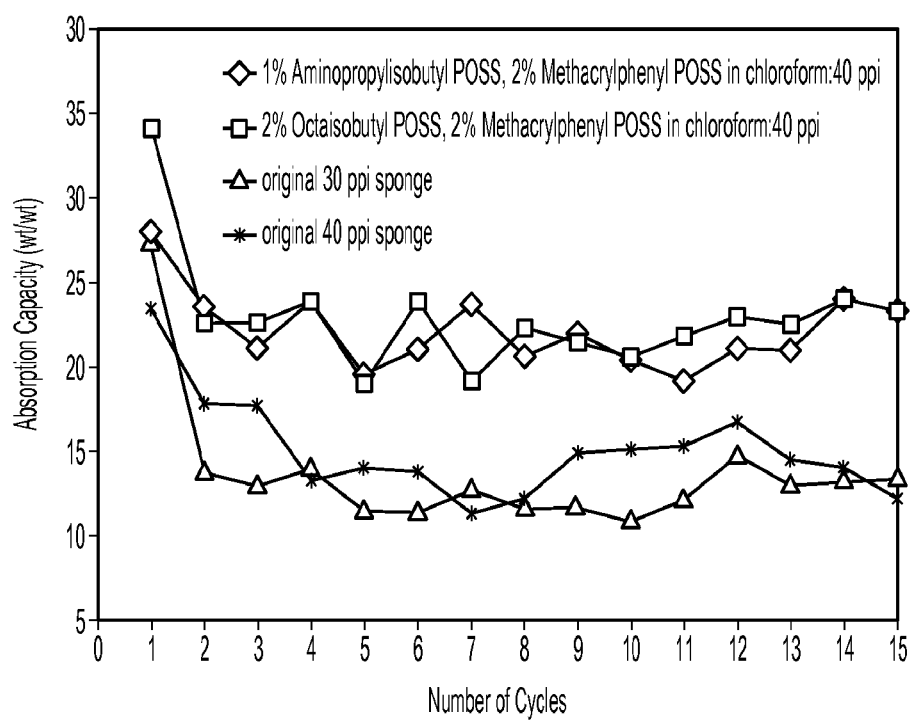
FIG. 1 is a graph depicting the recyclability of a modified polyurethane sponge of the present disclosure compared with an unmodified sponge.

In accordance with the present disclosure, porous absorbent materials are modified to enhance their affinity for hydrophobic substances, such as oil.

Suitable porous absorbent materials for use in accordance with the present disclosure, sometimes referred to herein as porous substrates, include classes of materials known as sponges. As used herein, a sponge is any natural or synthetic material having a light; yielding, porous, fibrous, three-dimensional skeleton or framework. Sponges are characterized by readily absorbing water and becoming soft when wet, while retaining toughness. Synthetic sponges in accordance with the present disclosure include those formed from polymeric materials such as polyurethanes.

Other polymeric materials, exhibiting similar morphology, can also be used effectively for oil absorption after appropriate surface modifications. Such materials include, for example, poly(methacrylic acid); polycaprolactone; polystyrene; acid-decomposable melamine formaldehyde particles; polyaniline; polypyrrole; chitosan; poly(acrylic acid); poly(allyamine hydrochloride); poly(2-(dimethylamine)ethyl methacrylate); polydivinylbenzene; polyfluorostyrene; polyethyleneglycol dimethacrylate); poly(N,N'-methylenebisacrylamide); poly(N-isopropylacrylamide); poly(N,N'-methylene bisacrylamide-co-methacrylic acid); Poly(4-vinylaniline-g-polyaniline); poly(styrenesulfonate); poly(vinylpyrrolidone); poly(L-lysine)hydrobromide; poly(L-glutamic acid); polycarbonate; methyl orange; poly(lactide-co-glycolide); poly(L-lactide); polyethyleneimine; polyethylene glycvol); polystyrene-b-poly-2-vinylpyridine; poly(3,4-ethylenedioxythiophene); poly-(p-phenylene-vinylene); poly(4-vinylpyridine-co-ethylene glycol dimethacrylate); (poly(3-hexylthiophene); polystyrene-b-polybutadiene; poly(vinylidene fluoride); poly(acrylonitrile); acrylonitrile-butadiene-styrene terpolymer; poly(maleic anhydride-alt-vinyl acetate); poly(styrene/sodium p-styrene sulfonate); phenol-formaldehyde resins; poly(methyl methacrylate); polyacrylamide; poly(ethoxylated trimethylopropane triacrylate); poly(dimethyl siloxane); polyethylene; poly(p-methylstyrene); poly(2-hydroxyethyl methacrylate-co-ethylene glycol dimethacrylate); poly(benzimidazole); polylactide-b-poly(norbornenylethylstyrene-s-styrene); poly(styrene-r-benzocyclobutene)-b-polylactide; (polystyrene containing triphenylamine side group)-b-polylactide; poly(ethylene-alt-propylene); poly(3-hexylthiophene); poly (3-dodecylthiophene); linear polyethylene; ethylene oxide-propylene oxide copolymers, including those sold under the name PLURONICS; polymeric materials based on monomers such as divinylbenzene, 1,3-Glycerol dimethacrylate, N,N'-methylenebis(acrylamide), ethylene glycol dimethacrylate, and diethyleneglycol dimethacrylate; combinations thereof, and the like.

Polyurethane (PU) is a synthetic polymer which can be fabricated into three dimensional porous sponges with interconnected void volumes. Due to this morphology, PU polymers have been used as gas/liquid filters, absorbents, etc. The pore size of PU sponges can be controlled during the manufacturing process.

The porosity of sponges of the present disclosure may be expressed as pores per inch (PPI). PPI provides information about how many pores are present along a linear, one inch line, and can be used to qualitatively denote pore sizes in terms of a length scale, such as millimeters (mm) or centimeters (cm). Polyurethane sponges of the present disclosure may possess a large number of pores, in embodiments from about 10 PPI to about 100 PPI, in other embodiments from about 30 PPI to about 50 PPI.

In accordance with the present disclosure, the hydrophilicity and/or hydrophobicity of the three-dimensional network making up a sponge may be adjusted to enhance its affinity for certain materials. Thus, for example, if the sponge is a three-dimensional hydrophilic network, it will attract hydrophilic fluids, such as water, therein, and essentially exclude other hydrophobic materials therefrom. Likewise, if the sponge is a three-dimensional hydrophobic network, it will attract hydrophobic fluids, such as oil, therein, and essentially exclude water therefrom.

In accordance with the present disclosure, the sponges are treated to render them more hydrophilic or more hydrophobic, thereby enhancing their affinity for like materials. In embodiments, hydrophilic sponges are treated to render them more hydrophobic, thus increasing their affinity for hydrophobic substances, such as oil.

In embodiments, hydrophilic polyurethane sponges may be modified to make them hydrophobic. In other embodiments, hydrophobic polyurethane sponges may be modified to make them even more hydrophobic.

In embodiments the sponge may then be contacted with silicon-based materials, such as siloxanes, to render the sponge hydrophobic. Suitable siloxanes utilized in accordance with the present disclosure include, in embodiments, polyhedral oligomeric silsesquioxanes (POSS). Polyhedral oligomeric silsesquioxanes, also referred to herein as polyhedral oligosilsesquioxanes (POSS) are organic silicon compounds possessing a cage-like structure. The physical sizes and structures of POSS components are on the nanometer dimension ($10^{-9}$ m). Accordingly, POSS reagents are frequently described as the smallest "silica-like" particles possible. Their nanometer size and unique hybrid (inorganic-organic) chemical composition are responsible for the many desirable property enhancements which have been observed upon incorporation of POSS reagents into polymer systems. POSS exhibits a number of potentially useful properties including high temperature stability in air and good adhesion to a number of substrates. POSS is also resistant to oxidation and degradation by ultraviolet light.

A suitable POSS that may be utilized to modify sponges in accordance with the present disclosure has the general formula $$[RSiO_{1.5}]_n \qquad (I)$$

where n is an even number and R is selected from the group consisting of substituted or unsubstituted aliphatic or aromatic hydrocarbon groups having one to about thirty carbon atoms.

POSS molecules useful herein may have the following general structure

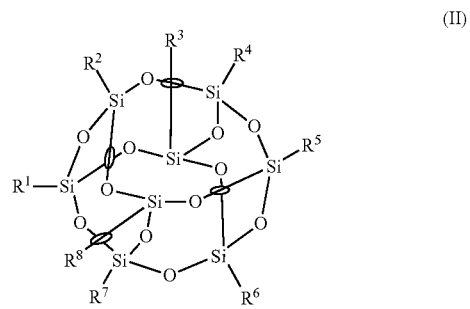

where n is an even number and R is the same or different at each occurrence and is selected from the group consisting of substituted or unsubstituted aliphatic or aromatic hydrocarbon groups having one to about thirty carbon atoms, in embodiments from about 2 to about 20 carbon atoms, in other embodiments from about 4 to about 12 carbon atoms. The hydrocarbon groups can be cyclic, branched or straight chained. The hydrocarbon groups can be saturated or may contain unsaturation. The hydrocarbon groups can be unsubstituted or substituted with one or more groups selected from the group consisting of methyl, methacrylphenyl, ethyl, isobutyl, isooctyl, cyclopentyl, cyclohexyl, vinyl, styryl, trimethylsiloxyl, trichlorosilylethyl, trichlorosilylpropyl, dichlorosilylethyl, chlorosilylethyl, phenyl, chlorobenzyl, cyanoethyl, cyanopropyl, norbornyl, fluoro, silanol, dimethylsilane, alkoxy, methacrylate, silane, aniline, amine, phenol, and alcohol. In certain embodiments, the hydrocarbon group is partially fluorinated or perfluorinated. Suitable R groups include, for example, cyclohexyl, cyclopentyl, methyl, isobutyl, octamethyl and octaisobutyl groups.

Functionalized POSS molecules can be prepared by processes within the purview of those skilled in the art, such as, for example, the processes taught by U.S. Pat. Nos. 5,484,867 and 5,939,576, the entire disclosures of each of which are incorporated by reference herein. Suitable POSS materials can also be obtained from commercial sources such as Hybrid Plastics (Fountain Valley, Calif., USA).

In embodiments, suitable POSS components used to modify a sponge of the present disclosure including trisilanol phenyl POSS, methacrylphenyl POSS, aminopropyl isobutyl POSS, octaisobutyl POSS, AminopropylIsooctyl POSS, Aminoethylaminopropyl POSS, N-Phenylaminopropyl POSS, OctaAminophenyl POSS, p-AminophenylCyclohexyl POSS, m-AminophenylIsobutyl POSS, DodecaPhenyl POSS, GlycidylIsooctyl POSS, Trifluoropropyl POSS, TrifluoropropylIsobutyl POSS, ChlorobenzylethylIsobutyl POSS, OctaSilane POSS, MercaptopropylIsobutyl POSS, Tris Sulfonic Acid Ethyl POSS, combinations thereof, and the like.

The sponge may be treated with the silicon material, including any of the above POSS, for a period of time from about 1 hour to about 24 hours, in embodiments from about 6 hours to about 20 hours.

After treatment with the siloxane, the sponge may then be dried in a vacuum oven at a suitable temperature, in embodiments from about 80° C. to about 140° C., in embodiments from about 100° C. to about 120° C., in embodiments about 110° C., for a suitable period of time, in embodiments from about 1 hour to about 12 hours, in embodiments from about 2 hours to about 5 hours.

The resulting sponge, having been modified with POSS, is hydrophobic and possesses great affinity for other hydrophobic substances, including oil.

The silicon material, in embodiments POSS, may be present in an amount from about 0.05% to about 3% by weight of the sponge to which it is applied, in embodiments from about 0.1% to about 2% by weight of the sponge to which it is applied, in other embodiments from about 0.3% to about 1% by weight of the sponge to which it is applied.

The performance of the sponges may be adjusted depending on the volume of the material utilized, the volume of pores, as well as the number and size of pores included in the sponge. The elastic properties of the sponge, including the polymer or other material(s) making up the sponge, as well as its inert chemical properties and mechanical strength, may also be considerations in selecting an appropriate sponge for the contemplated application. The nature of materials to be recovered, including the type of oil, may also be a consideration in selecting an appropriate sponge and subsequent treatment thereof.

For example, for oil removal, the surface tension and viscosity of the oil to be recovered will play a role in its removal. For example, high viscosity oils will require a longer amount of time to seep through the same size pores compared with lower viscosity oils. Surface tension can also affect the range over which pore dimensions are effective for oil removal.

The thickness of the sponge may vary from about 2 mm to about 200 mm, in embodiments from about 10 mm to about 100 mm, in embodiments from about 20 mm to about 50 mm in thickness. In some embodiments, the thickness of the sponge is from about 30 mm to about 40 mm.

In embodiments, the sponge possesses pores or voids which assist in the functioning of the sponge in absorbing hydrophobic materials. The diameter of these voids may be from about 0.05 mm to about 10 mm, in embodiments from about 0.1 mm to about 6 mm, in embodiments from about 0.2 mm to about 4 mm. In some embodiments, the pore size may be from about 0.3 mm to about 3 mm.

In some embodiments, the sponge may be asymmetrical, having varying pore sizes throughout the substrate. This asymmetry may enhance performance of a sponge.

In embodiments, the sponge, due to its pores and/or voids, may have a density from about 0.01 $g/cm^3$ to about 0.1 $g/cm^3$, in embodiments from about from about 0.015 $g/cm^3$ to about 0.05 $g/cm^3$, in embodiments from about 0.02 $g/cm^3$ to about 0.04 $g/cm^3$.

Sponges of the present disclosure, due to their absorption of oils or other hydrophobic substances, may exhibit an increase in weight from about 3 times to about 35 times the initial weight of the sponge, in embodiments from about 5 times to about 25 times the initial weight of the sponge, in embodiments from about 8 times to about 15 times the initial weight of the sponge.

The sponges of the present disclosure may be recycled. For example, the sponges may be placed in water possessing oil therein, absorb oil therefrom, and then squeezed to remove the oil from the sponge. After removal of the absorbed oil, the sponges may be re-used to absorb oil from the same or different waters having oil therein. Sponges of the present disclosure may be used from about 3 to about 20 times, in embodiments from about 4 to about 12 times, in embodiments from about 5 to about 6 times, and still remain effective in removing oil from water.

Sponges of the present disclosure are available at low-cost and, as noted above, can be re-used multiple times, making them very economical and easy to use.

One advantage for using synthetic polymeric sponges, instead of natural products, such as Luffa sponges, is the flexibility available to shape the porous materials to desired formats so as to be able to optimize the intended applications, such as for oil removal in open seas in an oil spill.

The following Examples are provided to illustrate, but not limit, the features of the present disclosure so that those skilled in the art may be better able to practice the features of the disclosure described herein.

Example 1

Porous PU sponges with different PPIs (pore sizes) were modified using silicon-based materials in order to change the hydrophobic nature of their surfaces so as to improve the oil-affinity of the modified sponges, and therefore to improve their ability to absorb oil more efficiently. In addition, the relationship between mean sponge pore size and oil viscosity was evaluated for more effective oil removal.

Porous PU sponges having different PPI values were obtained from New England Foam, Inc. The PPI of the six sponge samples were 10 PPI, 20 PPI, 30 PPI, 40 PPI, 80 PPI, 100 PPI.

Polyhedral oligomeric silsesquioxanes (POSS), purchased from Hybrid Plastic, Inc., was selected as the coating material. Methacrylphenyl POSS, octaisobutyl POSS, and aminopropylisobutyl POSS, were used.

Motor oil, commercially available as Castrol GTX 5W-30, 10W-30, 10W-40, and 20W-50, was purchased from BP lubricants USA Inc. A bio-oil sample (soybean oil) with high viscosity (about 1089 centistokes (cSt)) was obtained from United States Department of Agriculture (USDA). The basic properties of the oil samples are listed below in Table 1.

TABLE 1

Physical property of oil samples

| Oil Sample | Viscosity (cSt) | Density ($g/cm^3$) |
| --- | --- | --- |
| 5W-30 | 64 | 0.862 |
| 10W-30 | 75 | 0.878 |
| 10W-40 | 108 | 0.887 |
| 20W-50 | 159 | 0.884 |
| Soybean | 1089 | 1.17 |

The PU sponges with different PPI values had different porosities and fiber diameters. Information regarding porosity and polyurethane fiber diameter is listed below in Table 2.

TABLE 2

Porosity and polyurethane fiber diameter at different nominal PPI values

| PPI of PU sponge | Fiber diameter (mm) | Porosity (%) |
| --- | --- | --- |
| 10 | 0.52 ± 0.01 | 93%-96% |
| 30 | 0.18 ± 0.02 | 82%-89% |
| 40 | 0.08 ± 0.02 | 86%-87% |
| 100 | 0.03 ± 0.02 | 20%-33% |

Coating solutions were prepared by dissolving the POSS material in an appropriate solvent. The coating solutions used in the experiments were: aminopropylisobutyl POSS solution (2 wt %), used hexane as solvent; methacrylphenyl POSS (2 wt %) and octaisobutyl POSS (2 wt %) solutions both used chloroform as solvent; and methacrylphenyl POSS (2 wt %) and aminopropylisobutyl POSS (1 wt %) solutions both used chloroform as the solvent.

The sponges were dipped into the coating solution overnight, and then baked in an oven at a temperature of 90° C. for 3 hours.

The original and modified PU sponges were weighed and then placed into different oils until saturation. Subsequently, the sponges were taken out and weighed again. The absorption capacity was calculated as follows:

$$\text{Absorption Capacity} = W_2/W_1 \qquad (1)$$

where $W_2$ represents the weight of sponge after oil absorption, and $W_1$ is the original weight of the dry sponge.

It was observed that the modified PU sponge sank into the oil once it contacted the oil, while the original PU sponge floated on top of the oil unless it was pushed into the oil. The different affinity to oil indicated that the POSS coated PU sponge was more oleophilic, where oil could move into the pores more easily and quickly.

The sponges were manually squeezed after the oil absorption test so that the oil inside could be released. Then the sponge was put back into the oil for another oil absorption test. The "squeeze-absorption-squeeze" cycle was done multiple times to determine the recyclability of the modified sponges.

The results of the recycling test are shown in FIG. 1. Original and modified PU sponges were tested. Both showed the ability to be reused more than 15 times. The change in the absorption capacity during the recycling test revealed similar patterns for both the original and modified sponges: the absorption capacity at the very beginning was the highest, and then was relatively stable during the rest of the cycles.

Without wishing to be bond by any theory, it is believed that after the first contact with oil, the sponge fiber was covered by the oil and the oil would stay on the fiber when the bulk oil was being squeezed out of the sponge. This surface-coated oil took up some void volume of the sponge, so that there was a drop in the absorption capacity, as shown in FIG. 1.

In addition, as the oil stayed on the fiber surface, it provided an easier pathway for additional oil to get into the sponge void volume. The absorption capacity for the modified sponges was higher than that of the original sponges during the recycling test, possibly because the modified sponge surface was more hydrophobic in nature, and thereby easing the way for the oil to get into the inner part of the modified sponge more quickly.

For the less hydrophobic original sponge, the oil could not readily take up all the vacancies of the sponge and the residual oil did not uniformly stay on the fiber, resulting in a relatively lower efficiency for oil absorption when compared with modified sponges. Thus, for most practical applications, the modification of PU sponges clearly improved their absorption efficiency.

Example 2

Figure 2A:
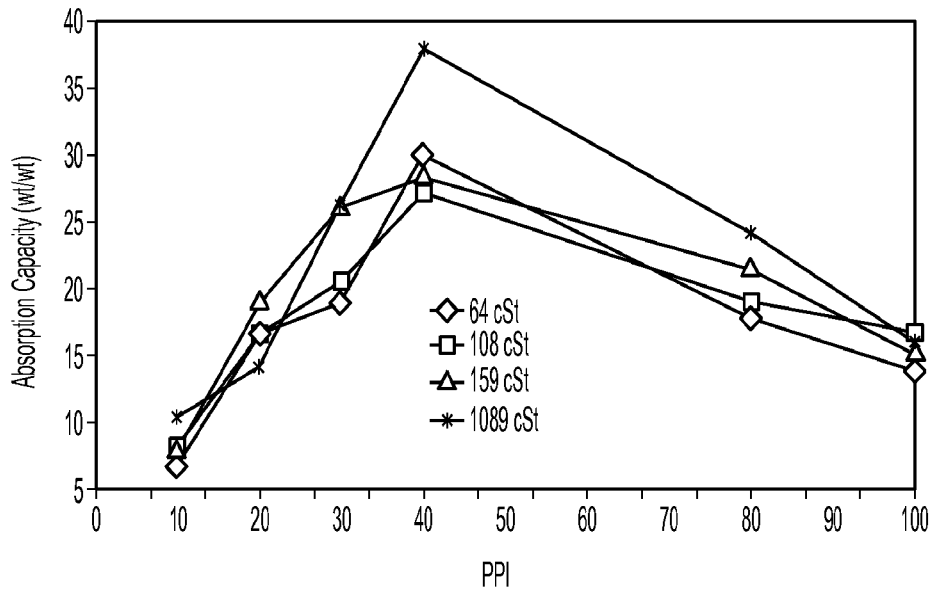
FIGS. 2A-2B are graphs depicting the relationship between absorption capacity and pores per inch (FIG. 2A) and pore size (FIG. 2B) for modified polyurethane sponges of the present disclosure.
Figure 2B:
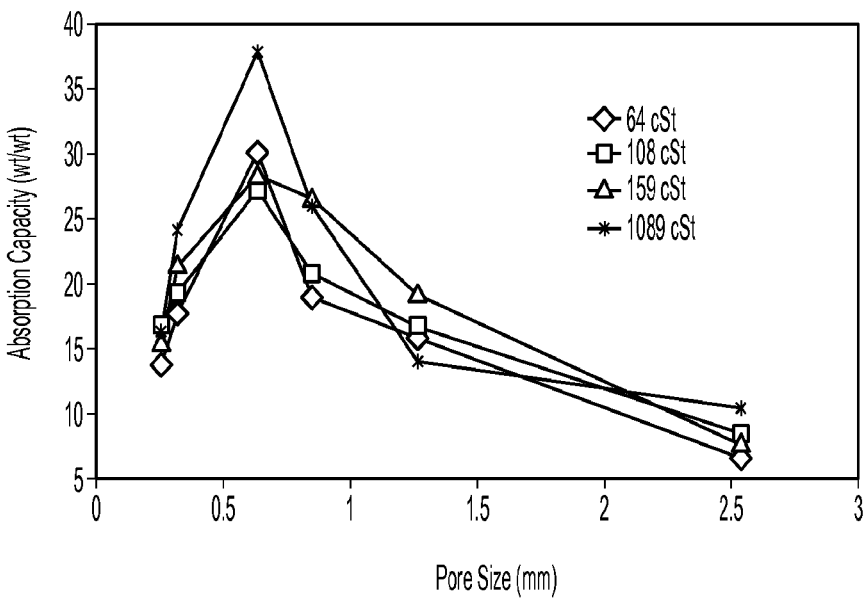

The viscosity effect was investigated on the sponges of Example 1 by testing the absorption capacity using the series of oils at different viscosities described above in Table 1. Modified PU sponges at different mean pore sizes were selected and tested for their absorption capacity to determine the effect pore size had on absorption capacity. FIG. 2 shows the pore size effect on absorption capacity.

From FIG. 2, it can be seen that the 40 PPI modified sponge had the highest absorption capacity for all kinds of tested oils. For low PPI sponges (larger mean pore size sponges), for example, 10 PPI and 20 PPI sponges, the larger pores could not hold the oils very well, even for the very high viscosity oil (1089 cst). For high PPI sponges (smaller mean pore size sponges), such as 100 PPI and 80 PPI, the porosity became too small to hold a large amount of oil.

With smaller mean pore sizes, it would also take longer time for the fluid (oil) to reach the interior of the sponge, especially when the overall sponge size became much larger. Thus, a medium pore size (around 0.64 mm, or 40 PPI) could be the optimal choice for oil absorption, based on the small sponge size used in the experiments.

As shown in FIG. 2, for sponges with the same pore size, higher viscosity oil could be absorbed more than lower viscosity oil.

The results suggest that for typical applications over the viscosity range of oil used, sponges having 40 PPI yielded good results for oil absorption. For practical applications with much larger sponge sizes, fine-tuning of the PPI may further optimize the oil removal application in practice.

In summary, the three dimensional highly porous sponge provides an excellent morphology for oil absorption. The surface of polyurethane sponges could be modified to be very hydrophobic with an appropriate surface coating. The highly hydrophobic and inter-connected porous structure created an ideal environment to absorb hydrocarbon-based oils. The sponge retained high absorption capacity after it was used multiple times. The mechanism for the high reusability could partially be explained by coating of the adsorbed layer of oil onto the PU fiber, resulting in sponges that retained an affinity for oil when used repeatedly. Pore size and viscosity effect were also investigated. One important finding was that the 40 PPI sponge, with a mean pore size of around 0.6 mm, had the best absorption capacity for different kinds of oils tested.

While the above description contains many specific details of methods in accordance with this disclosure, these specific details should not be construed as limitations on the scope of the disclosure, but merely as exemplifications of preferred embodiments thereof. Those skilled in the art will envision many other possible variations that are all within the scope and spirit of the disclosure.

What is claimed is:

1. An article comprising:
a porous polyurethane substrate; and
a silicon material on at least a portion of the porous polyurethane substrate, the silicon material including a polyhedral oligomeric silsesquioxane of the general formula $$[RSiO_{1.5}]_n \qquad (I)$$

where n is an even number and R is selected from the group consisting of aliphatic or aromatic hydrocarbon groups having from one to about thirty carbon atoms and possessing one or more groups selected from the group consisting of methyl, methacrylphenyl, ethyl, isobutyl, isooctyl, cyclopentyl, cyclohexyl, vinyl, styryl, trimethylsiloxyl, phenyl, chlorobenzyl, cyanoethyl, cyanopropyl, norbornyl, silanol, dimethylsilane, alkoxy, methacrylate, silane, aniline, amine, phenol, and alcohol,
wherein the porous substrate exhibits an increase in weight from about 3 times to about 35 times the initial weight of the porous substrate upon exposure to a hydrophobic material.

2. The article of claim 1, wherein the porous substrate has a thickness from about 10 mm to about 100 mm.

3. The article of claim 1, wherein the porous substrate possesses pores having a diameter from about 0.05 mm to about 10 mm.

4. The article of claim 1, wherein the porous substrate possesses from about 10 pores per inch to about 100 pores per inch.

5. The article of claim 1, wherein the porous substrate has a density from about 0.01 g/cm$^3$ to about 0.1 g/cm$^3$.

6. The article of claim 1, wherein the porous substrate may be used from about 3 times to about 20 times.

7. The article of claim 1, wherein R is selected from the group consisting of cyclohexyl, cyclopentyl, methyl, methacrylphenyl, isobutyl, octamethyl and octaisobutyl groups.

8. The article of claim 1, wherein the polyhedral oligomeric silsesquioxane is selected from the group consisting of trisilanol phenyl polyhedral oligomeric silsesquioxane, aminopropyl isobutyl polyhedral oligomeric silsesquioxane, octaisobutyl polyhedral oligomeric silsesquioxane, methacrylphenyl polyhedral oligomeric silsesquioxane, Aminopropyl Isooctyl polyhedral oligomeric silsesquioxane, Aminoethylaminopropyl polyhedral oligomeric silsesquioxane, N-Phenylaminopropyl polyhedral oligomeric silsesquioxane, OctaAminophenyl polyhedral oligomeric silsesquioxane, p-AminophenylCyclohexyl polyhedral oligomeric silsesquioxane, m-AminophenylIsobutyl polyhedral oligomeric silsesquioxane, DodecaPhenyl polyhedral oligomeric silsesquioxane, GlycidylIsooctyl polyhedral oligomeric silsesquioxane, oligomeric silsesquioxane, ChlorobenzylethylIsobutyl polyhedral oligomeric silsesquioxane, OctaSilane polyhedral oligomeric silsesquioxane, MercaptopropylIsobutyl polyhedral oligomeric silsesquioxane, Tris Sulfonic Acid Ethyl polyhedral oligomeric silsesquioxane, and combinations thereof.

9. The article of claim 1, wherein the polyhedral oligomeric silsesquioxane is present in an amount from about 0.05% to about 3% by weight of the porous substrate.

* * * * *